(12) United States Patent
Merker et al.

(10) Patent No.: US 7,411,779 B2
(45) Date of Patent: Aug. 12, 2008

(54) ELECTROLYTIC CAPACITORS WITH A POLYMERIC OUTER LAYER AND PROCESS FOR THE PRODUCTION THEREOF

(75) Inventors: Udo Merker, Köln (DE); Klaus Wussow, Netphen (DE)

(73) Assignee: H.C. Starck GmbH (DE)

( * ) Notice: Subject to any disclaimer, the term of this patent is extended or adjusted under 35 U.S.C. 154(b) by 146 days.

(21) Appl. No.: 11/488,968

(22) Filed: Jul. 19, 2006

(65) Prior Publication Data

US 2007/0171597 A1    Jul. 26, 2007

(30) Foreign Application Priority Data

Jul. 20, 2005    (DE)    ............. 10 2005 033 839

(51) Int. Cl.
   *H01G 9/00*    (2006.01)
(52) U.S. Cl. ............... 361/523; 361/525; 361/528; 361/529; 361/516; 361/519; 29/25.01; 29/25.03
(58) Field of Classification Search ............. 361/523, 361/525, 528–529, 530, 534, 541, 516–519, 361/508–512; 29/25.01, 25.03
   See application file for complete search history.

(56) References Cited

U.S. PATENT DOCUMENTS

| 4,910,645 | A |   | 3/1990 | Jonas et al. |
| 5,300,575 | A |   | 4/1994 | Jonas et al. |
| 5,972,052 | A |   | 10/1999 | Kobayashi et al. |
| 6,001,281 | A |   | 12/1999 | Lessner et al. |
| 6,206,937 | B1 | * | 3/2001 | Kudoh et al. ............ 29/25.03 |
| 6,219,223 | B1 | * | 4/2001 | Kobayashi et al. ......... 361/525 |
| 6,462,936 | B1 | * | 10/2002 | Fujimoto et al. .......... 361/525 |
| 6,522,527 | B2 | * | 2/2003 | Kojima et al. ............ 361/523 |
| 6,552,896 | B1 | * | 4/2003 | Igaki et al. ............. 361/523 |
| 6,882,522 | B2 | * | 4/2005 | Naito et al. ............. 361/523 |
| 6,987,663 | B2 |   | 1/2006 | Merker et al. |
| 2001/0018788 | A1 |   | 9/2001 | Bluvstein et al. |
| 2005/0111165 | A1 |   | 5/2005 | Merker et al. |

FOREIGN PATENT DOCUMENTS

| EP | 0 340 512 | 11/1989 |
| EP | 0 440 957 | 8/1991 |
| EP | 0 637 043 | 2/1995 |

(Continued)

OTHER PUBLICATIONS

John A. Walker et al., "New Chemically Prepared Conducting 'Pyrrole Blacks,'" *Journal of Polymer Science: Part A: Polymer Chemistry*, vol. 26, John Wiley & Sons, Inc., 1988, pp. 1285-1294.

(Continued)

*Primary Examiner*—Nguyen T Ha
(74) *Attorney, Agent, or Firm*—Connolly Bove Lodge & Hutz LLP

(57) ABSTRACT

The invention relates to a process for the production of electrolytic capacitors with low equivalent series resistance and low residual current consisting of a solid electrolyte made of conductive polymers and an outer layer containing conductive polymers, to electrolytic capacitors produced by this process and to the use of such electrolytic capacitors.

36 Claims, 2 Drawing Sheets

FOREIGN PATENT DOCUMENTS

| | | |
|---|---|---|
| EP | 0 825 626 | 2/1998 |
| EP | 1 524 678 | 4/2005 |
| JP | 2001-060535 | 3/2001 |
| JP | 2001-102255 | 4/2001 |
| JP | 2001-307958 | 11/2001 |
| JP | 2003-188052 | 7/2003 |
| WO | WO-01/16972 | 3/2001 |

OTHER PUBLICATIONS

Philippe Blanchard et al., "Thieno [3,4-b]-1,4-oxathiane: An Unsymmetrical Sulfur Analogue of 3,4-Ethylenedioxythiophene (EDOT) as a Building Block for Linear π-Conjugated Systems," *Organic Letters*, vol. 4, No. 4, American Chemical Society, 2002, 607-609.

Yasuo Kudoh et al., "Covering anodized Aluminum with Electropolymerized Polypyrrole via Magnanese Oxide Layer and Application to Solid Electrolytic Capacitor," *Journal of Power Sources*, vol. 60, 1996, pp. 157-163.

L. "Bert" Groenendaal et al., "Poly (3,4-ethylenedioxythiophene) and its Derivatives: Past, Present, and Future," *Advanced Material*, vol. 12, No. 7, 2000, pp. 481-494.

Dr. Gunter Schroder, "Polymere aus 3-Oxo-1 buten Sind Weiterhind Zuganglich Durch," *G-Market: Polymerisation von Acrylsauren bzw. Deren Estern,* pp. 1141-1152.

* cited by examiner

ELECTROLYTIC CAPACITORS WITH A POLYMERIC OUTER LAYER AND PROCESS FOR THE PRODUCTION THEREOF

RELATED APPLICATIONS

This application claims benefit to German application no. 10 2005 033 839 filed Jul. 20, 2005 which is incorporated by reference in its entirety for all useful purposes.

BACKGROUND OF THE INVENTION

1. Field of Invention

The invention relates to a process for the production of electrolytic capacitors with low equivalent series resistance and low residual current consisting of a solid electrolyte made of conductive polymers and an outer layer containing conductive polymers, to electrolytic capacitors produced by this process and to the use of such electrolytic capacitors.

2. Description of Related Art

A conventional commercial solid electrolytic capacitor generally consists of a porous metal electrode, an oxide layer located on the metal surface, an electrically conductive solid introduced into the porous structure, an outer electrode (contacting), such as a silver layer, and further electric contacts and encapsulation.

Examples of solid electrolytic capacitors are tantalum, aluminium, niobium and niobium oxide capacitors with charge transfer complexes, manganese dioxide or polymeric solid electrolytes. The use of porous bodies has the advantage that very high capacity densities, i.e. high capacitance, may be achieved in a small space owing to the large surface area.

π-conjugated polymers are particularly suitable as solid electrolytes owing to their high electrical conductivity. π-conjugated polymers are also called conductive polymers or synthetic metals. They are becoming increasingly important economically, as polymers have advantages over metals, with respect to processability, weight and the targeted adjustment of properties by chemical modification. Polypyrroles, polythiophenes, polyanilines, polyacetylenes, polyphenylenes and poly(p-phenylene-vinylenes) are examples of known π-conjugated polymers, poly-3,4-(ethylene-1,2-dioxy) thiophene, often also called poly(3,4-ethylenedioxythiophene), being a particularly important, industrially used polythiophene, as it has very high conductivity in its oxidised form.

Technical development in electronics increasingly requires solid electrolytic capacitors with very low equivalent series resistance (ESR). This is due, for example, to decreasing logic voltages, a higher integration density and increasing clock frequencies in integrated circuits. A low ESR also reduces the energy consumption, and this is particularly advantageous for mobile, battery-operated applications. There is therefore a wish to reduce the ESR of solid electrolytic capacitors as far as possible.

European patent specification EP-A 340 512 describes the production of a solid electrolyte made of 3,4-ethylene-1,2-dioxythiophene and the use of its cationic polymer produced by oxidative polymerisation as the solid electrolyte in electrolytic capacitors. Poly(3,4-ethylenedioxythiophene) as a substitute for manganese dioxide or charge transfer complex in the solid electrolytic capacitors reduces the equivalent series resistance of the capacitor owing to the higher electrical conductivity and improves the frequency behaviour.

In addition to a low ESR, modern solid electrolytic capacitors require a low residual current and good stability with respect to external stresses. High mechanical stresses that may greatly increase the residual current of the capacitor anode occur in particular during the production process when encapsulating the capacitor anodes.

Stability toward such stresses and therefore a low residual current may primarily be achieved by an approximately 5 to 50 μm thick outer layer made of conductive polymers on the capacitor anode. Such a layer is used as a mechanical buffer between the capacitor anode and the cathode-side electrode. This prevents the silver layer (contacting), for example when mechanically stressed, from coming into direct contact with the dielectric or from damaging it and thus increasing the residual current of the capacitor. The conductive polymeric outer layer itself should exhibit what is known as self-healing behaviour: relatively small defects in the dielectric on the outer anode surface, which occur despite the buffer effect, are electrically insulated by the conductivity of the outer layer being destroyed at the defective point by the electric current.

The formation of a thick polymeric outer layer by in situ polymerisation is very difficult. Layer formation requires a very large number of coating cycles in this process. As a result of the large number of coating cycles, the outer layer is coated very unevenly, in particular the edges of the capacitor anode are often inadequately covered. Japanese patent application JP-A 2003-188052 recites that homogeneous edge coverage requires expensive matching of the processing parameters. However, this makes the production process very susceptible to interruptions. An addition of binder materials for quicker layer build-up is also difficult, as the binder materials hinder the oxidative in situ polymerisation. In addition, the layer polymerised in situ generally has to be freed from residual salts by washing, whereby holes are produced in the polymer layer.

A dense electrically conductive outer layer with good edge coverage may be achieved by electrochemical polymerisation. However, electrochemical polymerisation requires that firstly a conductive foil is deposited on the insulating oxide layer of the capacitor anode and that this layer is then electrically contacted for each individual capacitor. This contacting is very expensive in mass production and may damage the oxide layer.

Conductive outer layers on capacitors may also be produced by mixing a powder of a conductive polymer with a binder and applying this mixture to a capacitor body. However, high contact resistance between the individual powder particles results in excessive electrical resistance, preventing the production of solid electrolytic capacitors with low ESR.

In EP-A-637043, the addition of conductive powders significantly increases the unevenness of an outer layer produced by chemical in-situ polymerisation, to allow improved adhesiveness between the outer graphite layer and the polymer film and thus to achieve lower ESR values and loss factors. A drawback of this method, however, is that the polymeric outer layer becomes very uneven (unevenness: 10 to 50 μm). As the overall thickness of the polymeric outer layer should be no greater than 5 to 50 μm, to achieve a low ESR, such a high degree of unevenness causes the outer layer to be locally very thin and high residual currents thus to occur. Voltage peaks and electrical breakdowns may also occur at the uneven points of the polymeric outer layer.

In Japanese patent applications JP-A 2001-102255 and JP-A 2001-060535, a layer of polyethylenedioxythiophene/polystyrene sulphonic acid (PEDT/PSS), also called polyethylenedioxythiophene/polystyrene sulphonic acid complex or PEDT/PSS complex, is applied directly to the oxide film to protect the oxide film and for improved adhesion of the solid electrolyte to the oxide film. The outer layer is then applied to this layer by in situ polymerisation or by impregnation of the capacitor anode with tetracyanoquinodimethane salt solution. However, this process has the drawback that the PEDT/PSS complex does not penetrate into porous anode bodies with small pores. Consequently, modern, highly porous anode materials cannot be used.

U.S. Pat. No. 6,001,281 describes, in the examples, capacitors with a solid electrolyte made of polyethylenedioxythiophene (PEDT) produced in situ and an outer layer made of PEDT/PSS complex. However, the drawback of these capacitors is that they have a high ESR of 130 mΩ and higher.

In EP-A-1524678, a polymeric outer layer is produced by applying a dispersion containing at least one polymeric anion and at least one optionally substituted polyaniline and/or at least one polythiophene with recurring units of general formula (I), (II) or recurring units of general formulae (I) and (II),

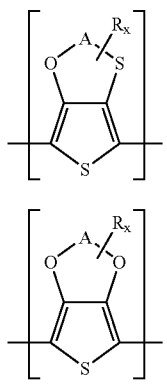

and a binder. Although this process allows the edge coverage to be improved, it does not allow the production of polymeric outer layers having a reliably reproducible density.

BRIEF SUMMARY OF THE INVENTION

There is therefore still a need for an improved process for the production of solid electrolytic capacitors with low equivalent series resistance (ESR), allowing a dense polymeric outer layer with good edge coverage to be produced in a simple and reliably reproducible manner. The object was therefore to provide a method of this type and the capacitors improved thereby.

It has surprisingly been found that dispersions containing particles of a polyaniline and/or polythiophene having a diameter of less than 700 nm, a binder and solid particles having a diameter in the range from 0.7 μm to 20 μm meet these requirements.

Surprisingly, the coarse solid particles having a diameter from 0.7 μm to 20 μm in dispersions have a significant effect on the formation of outer layers on electrolytic capacitors. The corner and edge coverage is substantially improved by these particles. The particles of a polyaniline and/or polythiophene having a diameter of less than 700 nm are not only responsible for the good conductivity of the layer and therefore the low ESR of the capacitor, they also smooth the unevenness caused by the solid particles. Dense and compact layers having uniform thickness, i.e. low unevenness, and therefore capacitors having a low residual current are thus obtained.

The present invention therefore relates to a process for the production of an electrolytic capacitor which comprises applying to a capacitor body at least comprising a porous electrode body of an electrode material, a dielectric covering the surface of this electrode material, a solid electrolyte at least comprising a conductive material, preferably a conductive polymer, that wholly or partially covers the dielectric surface, a dispersion a) containing at least particles b) of an electrically conductive polymer containing at least one optionally substituted polyaniline and/or at least one polythiophene with recurring units of general formula (I) or formula (II) or recurring units of general formulae (I) and (II)

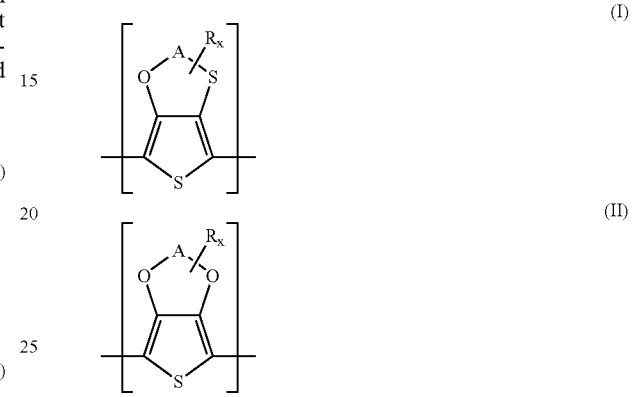

wherein

A represents an optionally substituted $C_1$ to $C_5$ alkylene radical,

R represents a linear or branched, optionally substituted $C_1$ to $C_{18}$ alkyl radical, an optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical or a hydroxyl radical, x represents an integer from 0 to 8 and if a plurality of radicals R are bound to A, these may be the same or different, and containing a binder c) and a dispersing agent d)

and, for forming an electrically conductive polymeric outer layer, the dispersing agent d) is at least partially removed and/or the binder c) is cured, characterised in that the proportion of the particles b) of the conductive polymer in the dispersion a) having a diameter of less than 700 nm forms a solids content of at least 5% by weight of the solids content of the dispersion, and in that, in addition to the components b) to d), solid particles e) having a diameter in the range from 0.7 to 20 μm are also contained in the dispersion.

A BRIEF DESCRIPTION OF THE FIGURES

A DETAILED DESCRIPTION OF THE INVENTION

Figure 1:
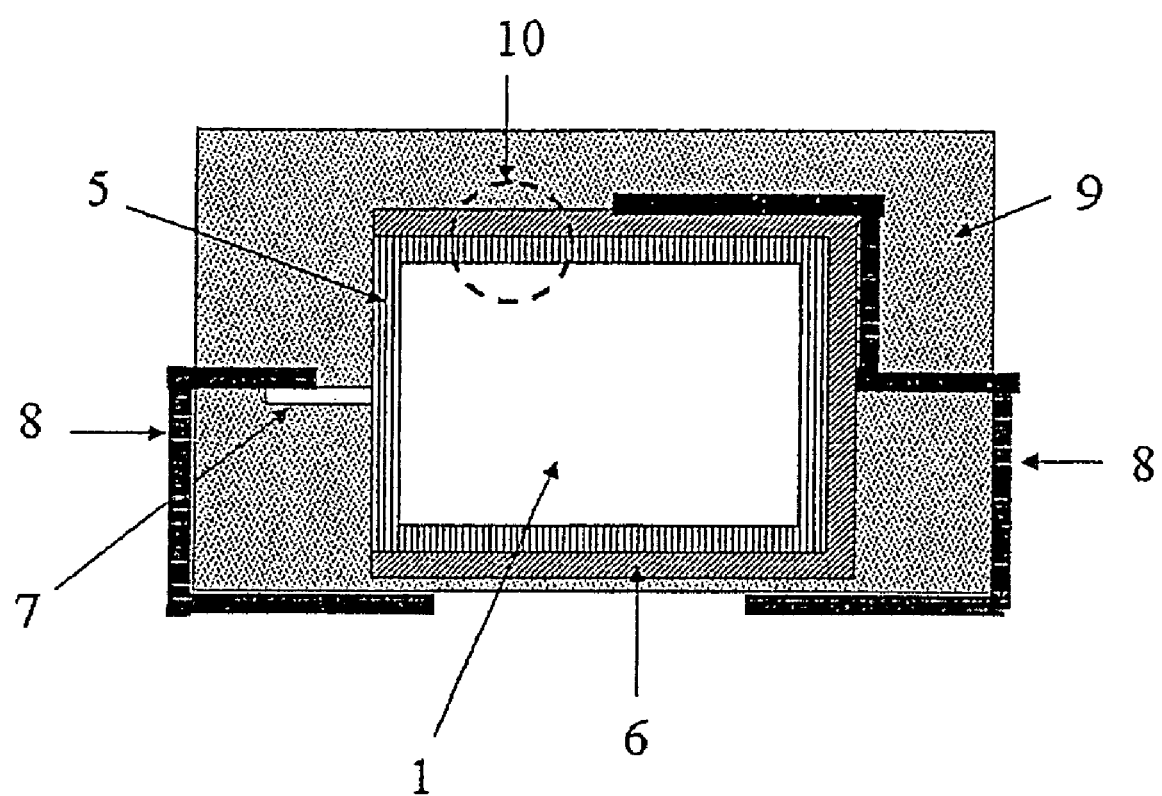
FIG. 1 is a diagram showing the structure of a solid electrolytic capacitor in the example of a tantalum capacitor.

The present invention therefore relates to a process for the production of an electrolytic capacitor which comprises applying a dispersion a) to a capacitor body wherein said capacitor body comprises a porous electrode body of an electrode material,
a dielectric covering the surface of this electrode material,
a solid electrolyte at least comprising a conductive material, preferably a conductive polymer, that wholly or partially covers the dielectric surface,
and said dispersion a) comprises at least
particles b) of an electrically conductive polymer containing at least one optionally substituted polyaniline and/or at least one polythiophene with recurring units of general formula (I) or formula (II) or recurring units of general formulae (I) and (II)

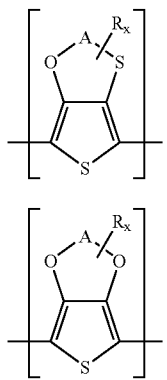

wherein
A represents an optionally substituted $C_1$ to $C_5$ alkylene radical,
R represents a linear or branched, optionally substituted $C_1$ to $C_{18}$ alkyl radical, an optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical or a hydroxyl radical,
x represents an integer from 0 to 8 and
if a plurality of radicals R are bound to A, these may be the same or different,
and containing a binder c) and a dispersing agent d)
and, for forming an electrically conductive polymeric outer layer,
the dispersing agent d) is at least partially removed and/or the binder c) is cured,
wherein the proportion of the particles b) of the conductive polymer in the dispersion a) having a diameter of less than 700 nm forms a solids content of at least 5% by weight of the solids content of the dispersion,
and in that, in addition to the components b) to d), solid particles e) having a diameter in the range from 0.7 to 20 μm are also contained in the dispersion.

The proportion of particles e) in the dispersion is preferably at least 5% by weight of the solids content of the dispersion.

General formulae (I) and (II) are to be understood such that x substituents R may be bound to the alkylene radical A.

The diameter of the particles b) is determined, for example, by ultracentrifuge measurement. A diameter distribution of the particles b) relates to a mass distribution of the particles in the dispersion as a function of the particle diameter.

The diameter of the solid particles e) in the dispersion is determined, for example, by laser diffraction measurement. A diameter distribution of these solid particles relates to a volume distribution of the solid particles e) in the dispersion as a function of the particle diameter.

In the dispersion a), the proportion of the particles b) having a diameter of less than 700 nm, based on their solids content, is preferably at least 10% by weight, particularly preferably at least 15% by weight of the solids content of the dispersion.

The proportion of the particles b) having a diameter of less than 500 nm, based on their solids content, is particularly preferably at least 5% by weight, more particularly preferably at least 10% by weight, even more particularly preferably at least 15% by weight of the solids content of the dispersion a).

The proportion of the particles b) having a diameter of less than 400 nm, based on their solids content, is particularly preferably at least 5% by weight, more particularly preferably at least 10% by weight, even more particularly preferably at least 15% by weight of the solids content of the dispersion a).

In the process, the particles b) of the conductive polymer in the dispersion a) preferably have an average diameter from 5 to 500 nm, particularly preferably from 10 to 300 nm.

The proportion of the solid particles e) having a diameter in the range from 0.7 μm to 20 μm is preferably at least 10% by weight, particularly preferably at least 15% by weight of the solids content of the dispersion a).

The proportion of the solid particles e) having a diameter in the range from 1 μm to 10 μm is particularly preferably at least 5% by weight, more particularly preferably at least 10% by weight, even more particularly preferably at least 15% by weight of the solids content of the dispersion a).

The proportion of the solid particles e) having a diameter in the range from 1 μm to 5 μm is particularly preferably at least 5% by weight, more particularly preferably at least 10% by weight, even more particularly preferably at least 15% by weight of the solids content of the dispersion a).

In the dispersion a), the solid particles e) preferably have an average diameter from 1 μm to 10 μm, particularly preferably an average diameter from 1 μm to 5 μm.

In the dispersion a), the solid particles e) preferably have a diameter distribution d10 value of greater than 0.9 μm and a d90 value of less than 15 μm, particularly preferably a d10 value of greater than 1 μm and a d90 value of less than 10 μm, even more particularly preferably a d10 value of greater than 1.2 μm and a d90 value of less than 8 μm.

The diameter distribution d10 value indicates that particles having a diameter of less than or equal to the d10 value constitute 10% of the total volume of all of the solid particles e) in the dispersion a). The diameter distribution d90 value indicates that particles having a diameter of less than or equal to the d90 value constitute 90% of the total volume of all of the solid particles e) in the dispersion a).

The particles b) of the conductive polymer, the binder c) and the solid particles e) preferably form a stable dispersion. Unstable dispersions may, however, also be used, provided that they are, for example stirred, rolled or shaken prior to use, to ensure uniform distribution of the components.

The solid particles e) may be inorganic particles, organic particles or a mixture of organic and inorganic particles, and have, in particular, a composition differing from that of the components b) and c).

The solid particles e) used may be conventional fillers, for example carbonates such as calcium carbonate, silicates, silica, calcium or barium sulphate, aluminium hydroxide, glass fibres or bulbs, wood flour, cellulose powder or carbon black.

Particularly suitable inorganic solid particles e) consist, for example, of carbon, graphite, carbon black, metals, metal oxides, ceramics, silicates, silicon, silicon oxides, preferably silicon dioxides, such as precipitated silicas, pyrogenic silicas, silica sols, quartzes or glass. Particularly preferred are precipitated silicas, pyrogenic silicas and silica sols.

Organic solid particles e) consist, for example, of polymers, in particular of electrically conductive polymers, or cellulose.

The solid particles e) are preferably introduced into the dispersion a) in powder form, but may also be present in another form, for example as fibres or bulbs.

Conductive polymers as a basis for the solid particles include, for example, polythiophenes, polypyrroles and polyanilines, which may be substituted or unsubstituted.

Preferred conductive polymers for the solid particles e) include polythiophenes with recurring units of general formula (I), (II) or recurring units of general formulae (I) and (II), wherein A, R and x have the meanings specified above for general formulae (I) and (II).

A particularly preferred conductive polymer in the solid particles e) is poly(3,4-ethylene dioxythiophene).

The electrode material preferably forms a porous body with a large surface area, for example in the form of a porous sintered compact or an etched foil, in the electrolytic capacitor produced by the process according to the invention. This porous body will also be shortened to electrode body hereinafter.

The electrode body covered with a dielectric will also be shortened to oxidised electrode body hereinafter. The term "oxidised electrode body" also includes electrode bodies that are covered by a dielectric, which was not produced by oxidation of the electrode body.

The electrode body covered with a dielectric and wholly or partially with a solid electrolyte will also be shortened to capacitor body hereinafter.

The electrically conductive layer, which is produced from the dispersion a) by the process according to the invention and which comprises at least one optionally substituted polyaniline and/or at least one polythiophene with recurring units of general formula (I) or formula (II) or recurring units of general formulae (I) and (II), and also at least one binder c) and solid particles s), will be called the polymeric outer layer hereinafter.

The dispersion a) preferably comprises at least one polymeric organic binder c). Examples of particularly preferred polymeric, organic binders c) include polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulphones, melamine formaldehyde resins, epoxide resins, silicone resins or celluloses. Further preferred polymeric organic binders c) also include those which may be produced by adding crosslinking agents, such as melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Crosslinking products of this type suitable as polymeric binders c) may also be formed, for example, by reacting the added crosslinking agents with any polymeric anions contained in the dispersion a). Binders that are sufficiently stable to heat to resist the temperatures to which the finished capacitors are subsequently exposed, for example soldering temperatures of 220 to 260° C., are preferred.

The solids content of the preferred polymeric binder c) in the dispersion a) is 0.1 to 90% by weight, preferably 0.5 to 30% by weight and particularly preferably 0.5 to 10% by weight.

Preferably, sufficient binder c) is added to the dispersion a) for effective adhesion of the polymeric outer layer to the capacitor body and high stability within the polymeric outer layer to be obtained. The ratio of the solids content (% by weight) of the binder c) to the solids content of the solid particles e) is therefore preferably greater than 1:2, particularly preferably greater than 1:1. The mechanical stability of the layer and the bonding of the layer to the capacitor body are thus further increased.

The dispersions a) may contain 1 or more dispersing agents d). Examples of the dispersing agents d) include the following solvents. Aliphatic alcohols such as methanol, ethanol, i-propanol and butanol, aliphatic ketones such as acetone and methyl ethyl ketones; aliphatic carboxylic acid esters such as ethyl acetate and butyl acetate; aromatic hydrocarbons such as toluene and xylene, aliphatic hydrocarbons such as hexane, heptane and cyclohexane; chlorinated hydrocarbons such as dichloromethane and dichloroethane; aliphatic nitriles such as acetonitrile; aliphatic sulphoxides and sulphones such as dimethyl sulphoxide and sulpholane; aliphatic carboxylic acid amides such as methylacetamide, dimethylacetamide and dimethylformamide; aliphatic and araliphatic ethers such as diethylether and anisole. The dispersing agent d) used may also be water or a mixture of water and the aforementioned organic solvents.

Preferred dispersing agents d) include water or other protic solvents such as alcohols, for example methanol, ethanol, i-propanol and butanol, as well as mixtures of water with these alcohols; particularly preferred as a solvent is water.

The binder c) may also optionally act as a dispersing agent d).

According to the invention, the term "polymers" includes all compounds with more than one identical or different repeating unit.

Conductive polymers are taken to mean, in particular, the category of π-conjugated polymers that have electrical conductivity after oxidation or reduction. Conductive polymers are preferably taken to mean π-conjugated polymers that have electrical conductivity of approximately at least 1 µS cm$^{-1}$ after oxidation.

Within the context of the invention, the prefix poly is taken to mean that more than one identical or different recurring unit is contained in the polymer or polythiophene. The polythiophenes contain a total of n recurring units of general formula (I) or formula (II) or of general formulae (I) and (II), n being an integer from 2 to 2,000, preferably 2 to 100. The recurring units of general formula (I) and/or (II) may each be the same or different within a polythiophene. Polythiophenes with identical recurring units of general formula (formulae) (I), (II) or (I) and (II) in each case are preferred.

At the terminal groups, the polythiophenes each preferably carry H.

The solid electrolyte may contain optionally substituted polythiophenes, optionally substituted polypyrroles or optionally substituted polyanilines as the conductive polymers.

Preferred conductive polymers for the solid electrolyte are polythiophenes with recurring units of general formula (I), (II) or recurring units of general formulae (I) and (II), wherein A, R and x have the meaning given above for general formulae (I) and (II).

Polythiophenes with recurring units of general formula (I), (II) or recurring units of general formulae (I) and (II), wherein A represents an optionally substituted $C_2$ to $C_3$ alkylene radical and x represents 0 or 1, are particularly preferred.

Poly(3,4-ethylenedioxythiophene) is most preferred as the conductive polymer of the solid electrolyte.

$C_1$ to $C_5$ alkylene radicals A are preferably methylene, ethylene, n-propylene, n-butylene or n-pentylene. $C_1$ to $C_{18}$ alkyls preferably represent linear or branched $C_1$ to $C_{18}$ alkyl radicals such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$ to $C_{12}$ cycloalkyl radicals R represent, for example, cyclopentyl, cyclohexyl, cycloheptyl, cyclooctyl, cyclononyl or cyclodecyl, $C_5$ to $C_{14}$ aryl radicals R represent, for example, phenyl or naphthyl, and $C_7$ to $C_{18}$ aralkyl radicals represent, for example, benzyl, o-, m-, p-tolyl, 2,3-, 2,4-, 2,5-, 2-6, 3-4-, 3,5-xylyl or mesityl. The preceding list is used by way of example to illustrate the invention and should not be regarded as conclusive.

Numerous organic groups may be considered as optional further substituents for the radicals A and/or the radicals R, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxylamide groups.

The above-mentioned radicals A and R and/or the further substituents for the radicals A and R may, for example, be considered as substituents for polyaniline. Unsubstituted polyanilines are preferred.

The polythiophenes used as the solid electrolyte in the preferred process may be neutral or cationic. In preferred embodiments they are cationic, "cationic" only referring to the charges located on the polythiophene main chain. Depending on the substituent on the radicals R, the polythiophenes may carry positive and negative charges in the structural unit, the positive charges being located on the polythiophene main chain and the negative charges optionally on the radicals R substituted by sulphonate or carboxylate groups. In this case the positive charges of the polythiophene main chain may be partially or wholly saturated with the optionally present anionic groups on the radicals R. Viewed overall, the polythiophenes may, in these cases, be cationic, neutral or even anionic. Nevertheless, they are all regarded as cationic polythiophenes within the scope of the invention as the positive charges on the polythiophene main chain are crucial. The positive charges are not illustrated in the formulae as their exact number and position cannot be perfectly established. However, the number of positive charges is at least one and at most n, n being the total number of all recurring units (identical or different) within the polythiophene.

To compensate the positive charge, if this has not already taken place as a result of the optionally sulphonate- or carboxylate-substituted and therefore negatively charged radicals R, the cationic polythiophenes require anions as the counterions.

Counterions may be monomeric or polymeric anions, the latter also being called polyanions hereinafter.

Polymeric anions for use in the solid electrolyte can, for example, be anions of polymeric carboxylic acids, such as polyacrylic acids, polymethacrylic acid or polymaleic acids or polymeric sulphonic acids, such as polystyrene sulphonic acids and polyvinyl sulphonic acids. These polycarboxylic and sulphonic acids may also be copolymers of vinyl carboxylic and vinyl sulphonic acids with other polymerisable monomers, such as acrylic acid esters and styrene.

Preferably, monomeric anions are used for the solid electrolytes as they penetrate better into the oxidised electrode body.

Suitable monomeric anions include, for example, those of $C_1$ to $C_{20}$ alkane sulphonic acids, such as the methane, ethane, propane, butane or higher sulphonic acids, such as dodecane sulphonic acid, of aliphatic perfluorosulphonic acids, such as trifluoromethane sulphonic acid, perfluorobutane sulphonic acid or the perfluorooctane sulphonic acid, of aliphatic $C_1$ to $C_{20}$ carboxylic acids such as 2-ethyl-hexylcarboxylic acid, of aliphatic perfluorocarboxylic acids, such as trifluoroacetic acid or perfluorooctanoic acid, and of aromatic sulphonic acids optionally substituted by $C_1$ to $C_{20}$ alkyl groups, such as benzene sulphonic acid, o-toluene sulphonic acid, p-toluene sulphonic acid or dodecylbenzene sulphonic acid and of cycloalkane sulphonic acids such as camphor sulphonic acid or tetrafluoroborates, hexafluorophosphates, perchlorates, hexafluoroantimonates, hexafluoroarsenates or hexachloroantimonates.

The anions of p-toluene sulphonic acid, methane sulphonic acid or camphor sulphonic acid are preferred.

Cationic polythiophenes that contain anions as counterions for charge compensation are often also known by experts as polythiophene/(poly)anion complexes.

Apart from the conductive polymers and optionally also counterions, the solid electrolyte may contain binders, crosslinking agents, surface-active substances, such as ionic or non-ionic surfactants or adhesives and/or further additives.

Adhesives are, for example, organofunctional silanes and their hydrolysates, for example 3-glycidoxypropyltrialkyloxysilane, 3-aminopropyltriethoxysilane, 3-mecaptopropyltrimethoxysilane, 3-metacryloxypropyltrimethoxysilane, vinyltrimethoxysilane or octyltriethoxysilane.

The solid electrolyte preferably comprises the conductive polymer and monomeric anions as the counterions.

The solid electrolyte preferably forms, on the dielectric surface, a layer with a thickness of less than 200 nm, particularly preferably less than 100 nm, more preferably less than 50 nm.

The covering of the dielectric with the solid electrolyte can be determined as follows: the capacitance of the capacitor is measured in the dry and moist state at 120 Hz. The degree of coverage is the ratio of the capacitance in the dry state to the capacitance in the moist state, expressed as a percentage. Dry state means that the capacitor has been dried over several hours at elevated temperature (80 to 120° C.) before it is measured. Moist state means that the capacitor has been exposed to saturated atmospheric moisture over several hours at elevated pressure, for example in a vapour pressure vessel. The moisture penetrates into pores that are not covered by the solid electrolyte and acts as a liquid electrolyte therein.

The coverage of the dielectric by the solid electrolyte is preferably greater than 50%, particularly preferably greater than 70%, more preferably greater than 80%.

Figure 2:
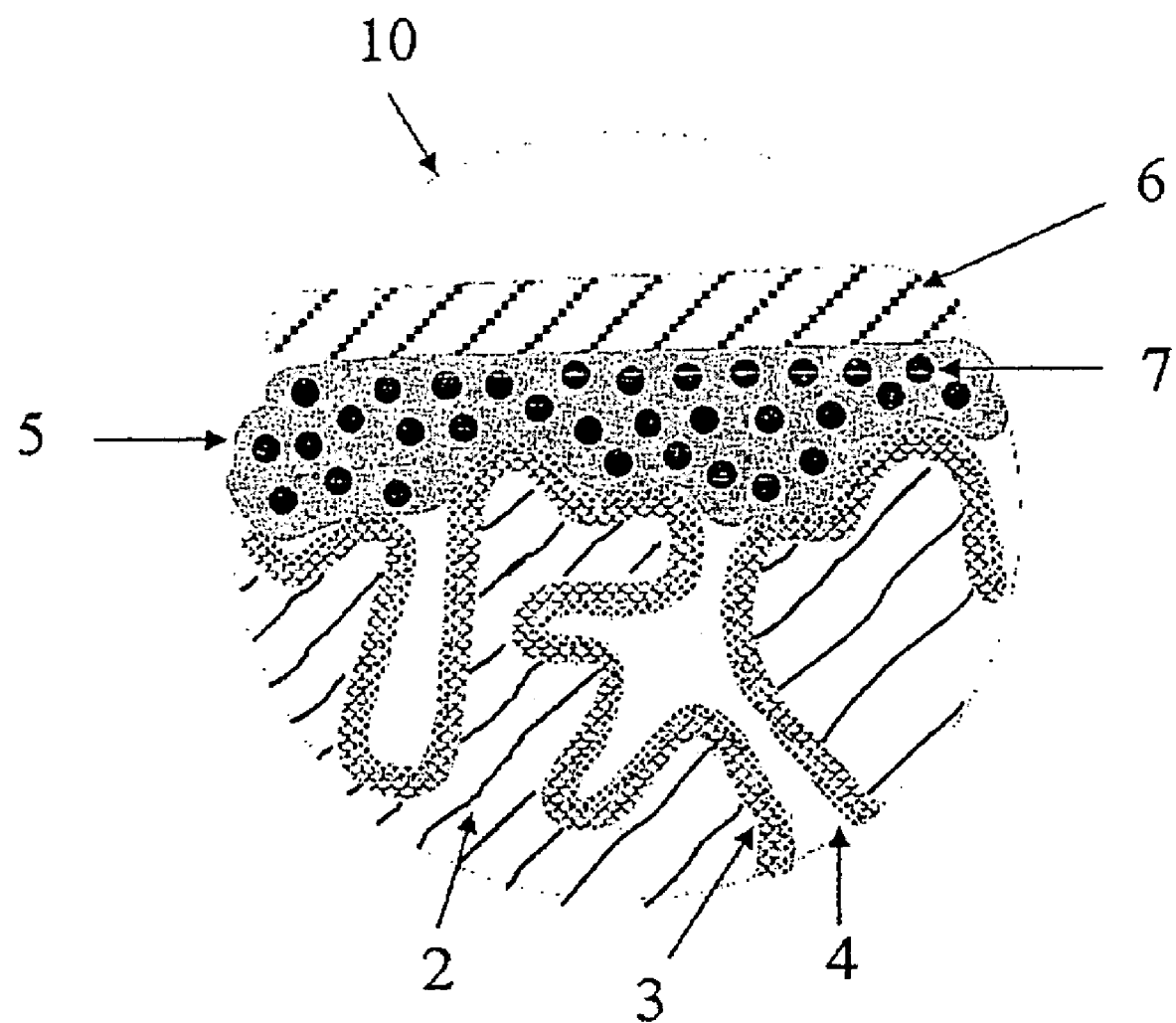
FIG. 2 shows the enlarged detail 10 from FIG. 1 that reproduces the schematic layer structure of the tantalum capacitor.

As shown schematically and by way of example in FIG. 1 and FIG. 2, the polymeric outer layer is preferably located on all of the external surface of the capacitor body or a portion thereof. External surface is taken to mean the outer faces of the capacitor body.

FIG. 1 is a diagram showing the structure of a solid electrolytic capacitor in the example of a tantalum capacitor comprising 1 capacitor body
5 polymeric outer layer
6 graphite/silver layer 7 wire contact to the electrode body 2
8 external contacts
9 encapsulation
10 detail FIG. 2 shows the enlarged detail 10 from FIG. 1 that reproduces the schematic layer structure of the tantalum capacitor comprising 10 detail
2 porous electrode body (anode)
3 dielectric
4 solid electrolyte (cathode)
5 polymeric outer layer
6 graphite/silver layer
7 solid particle Geometric surface area is hereinafter taken to mean the outer face of the capacitor body 1 that is obtained from the geometric dimensions. For right parallelepiped sintered compacts the geometric surface area is accordingly:

geometric surface area=$2(L*B+L*H+B*H)$, wherein L is the length, B the width and H the height of the body and * represents the multiplication sign. Only a portion of the capacitor body 1 on which the polymeric outer layer is located is examined.

If a plurality of capacitor bodies 1 are used in a capacitor, then the individual geometric surface areas add up to a total geometric surface area.

For solid electrolytic capacitors that contain, for example, a wound foil as the porous electrode body, the dimensions of the developed foil (length, width) are used as measurements.

Instead of solid electrolytes containing a conductive polymer, the solid electrolytic capacitors may also contain solid electrolytes containing a non-polymeric conductive material, such as charge transfer complexes, such as TCNQ (7,7,8,8-tetracyano-1,4-quinodimethane), manganese oxide or salts, for example those which can form ionic liquids. The polymeric outer layer also leads to lower residual currents in solid electrolytic capacitors of this type.

The same preferred structural features as for the polythiophenes in the solid electrolyte apply to the polythiophenes of the particles b) of the electrically conductive polymer with recurring units of general formula (I), (II) or recurring units of general formulae (I) and (II) located in the dispersion a).

Polymeric or monomeric anions may function as the counterion for the polyanilines and/or the polythiophenes of the aforementioned particles b) with recurring units of general formula (I), (II) or recurring units of general formulae (I) and (II). However, additional counterions may also be provided in the layer. However, polymeric anions are preferably used as counterions in the dispersion a).

Polymeric anions may, for example, be anions of polymeric carboxylic acids, such as polyacrylic acids, polymethacrylic acid or polymaleic acids or polymeric sulphonic acids, such as polystyrene sulphonic acids and polyvinyl sulphonic acids. These polycarboxylic and sulphonic acids may also be copolymers of vinylcarboxylic and vinylsulphonic acids with other polymerisable monomers, such as acrylic acid esters and styrene.

An anion of a polymeric carboxylic or sulphonic acid is preferred as the polymeric anion in the aforementioned particles b).

The anion of polystyrene sulphonic acid (PSS) is particularly preferred as the polymeric anion.

The molecular weight of the polyacids providing the polyanions is preferably 1,000 to 2,000,000, particularly preferably 2,000 to 500,000. The polyacids or their alkali metal salts are commercially available, for example polystyrene sulphonic acids and polyacrylic acids, or else may be produced by known processes (see, for example, Houben Weyl, Prozessen der organischen Chemie, vol. E 20 Makromolekulare Stoffe, part 2, (1987), p. 1141 ff).

Polymeric anion(s) and electrically conductive polymers may be present in the dispersion a) in a ratio by weight of 0.5:1 to 50:1, preferably 1:1 to 30:1, particularly preferably 2:1 to 20:1. The weight of the electrically conductive polymers corresponds here to the weighed-in portion of the monomers used, assuming that there is a complete conversion during polymerisation.

The dispersion a) may also contain monomeric anions. The same preferred anions as listed above for the solid electrolyte apply to the monomeric anions.

The dispersion a) may also contain further components such as surface-active substances, for example ionic and non-ionic surfactants or adhesives, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane.

The thickness of the polymeric outer layer is preferably 1 to 1,000 μm, particularly preferably 1 to 100 μm, more particularly preferably 2 to 50 μm, even more preferably 4 to 20 μm. The layer thickness may vary on the external surface. In particular, the layer thickness may be thicker or thinner at the edges of the capacitor body than on the lateral faces of the capacitor body. A layer of virtually homogeneous thickness is, however, preferred.

The polymeric outer layer may have a homogeneous or inhomogeneous distribution with respect to its composition relative to the binders c) and conductive polymers. Homogeneous distributions are preferred.

The polymeric outer layer may be a component of a multi-layer system that forms the outer layer of the capacitor body. Therefore, one or more further functional layers (for example, adhesive layers) may be located between the solid electrolyte and the polymeric outer layer, although this should not restrict the electrical function of the polymeric outer layer. Further functional layers may also be located on the polymeric outer layer. A plurality of polymeric outer layers may also be located on the capacitor body.

The polymeric outer layer is preferably located directly on the solid electrolyte. The polymeric outer layer preferably penetrates into the edge region of the capacitor body to achieve good electrical contact with the solid electrolyte and to increase the adhesion to the capacitor body, but does not penetrate into the entire depth of all pores (cf. for example FIG. 2).

In a particularly preferred embodiment, the electrolytic capacitor produced by the process according to the invention contains a solid electrolyte containing poly(3,4-ethylenedioxythiophene) (PEDT) and a polymeric outer layer containing polystyrene sulphonic acid (PSS) and poly(3,4-ethylenedioxythiophene), the latter frequently also being called PEDT/PSS or PEDT/PSS in the literature.

In a particularly preferred embodiment, the electrolytic capacitor produced by the process according to the invention comprises a solid electrolyte made of poly(3,4-ethylenedioxythiophene) and monomeric counterions and a polymeric outer layer made of PEDT/PSS, a binder c) and solid particles e).

Also preferred is a process for the production of electrolytic capacitors, characterised in that the electrode material is a valve metal or a compound with electrical properties comparable to those of a valve metal.

Within the scope of the invention, a valve metal is taken to mean metals of which the oxide layers do not allow the flow of current equally in both directions. With anodically applied voltage, the oxide layers of the valve metals block the flow of current, while with cathodically applied voltage, excessive currents occur that may destroy the oxide layer. The valve metals include Be, Mg, Al, Ge, Si, Sn, Sb, Bi, Ti, Zr, Hf, V, Nb, Ta and W and an alloy or compound of at least one of these metals with other elements. The best known representatives of the valve metals are Al, Ta and Nb. Compounds with electrical properties comparable to those of a valve metal are those with metallic conductivity that may be oxidised and of which the oxide layers have the properties described above. NbO, for example, has metal conductivity but is not generally regarded as a valve metal. However, layers of oxidised NbO have the typical properties of valve metal oxide layers, so NbO or an alloy or compound of NbO with other elements are typical examples of such compounds with electrical properties comparable to those of a valve metal.

Accordingly, the term "oxidisable metal" is taken to mean not only metals but also an alloy or compound of a metal with other elements, provided they possess metal conductivity and may be oxidised.

Therefore, the present invention particularly preferably relates to a process for the production of electrolytic capacitors, characterised in that the valve metal or the compound with electrical properties comparable to those of a valve metal is tantalum, niobium, aluminium, titanium, zirconium, hafnium, vanadium, an alloy or compound of at least one of these metals with other elements, NbO or an alloy or compound of NbO with other elements.

The dielectric preferably consists of an oxide of the electrode material. It optionally contains further elements and/or compounds.

The capacitance of the oxidised electrode body depends on the surface area and the thickness of the dielectric, in addition to the type of dielectric. The charge-mass ratio is a measure of how much charge per unit of weight the oxidised electrode body may absorb. The charge-mass ratio is calculated as follows:

Charge-mass ratio=(capacitance*voltage)/weight of the oxidised electrode body.

The capacitance is obtained from the capacitance of the finished capacitor measured at 120 Hz, and the voltage is the operating voltage of the capacitor (rated voltage). The weight of the oxidised electrode body is based on the mere weight of the porous electrode material coated with dielectric, without polymers, contacts and encapsulation.

The electrolytic capacitors produced by the new process preferably have a charge-mass ratio higher than 10,000 µC/g, particularly preferably higher than 20,000 µC/g, more preferably higher than 30,000 µC/g, most preferably higher than 40,000 µC/g.

The solid electrolytic capacitor produced by the process according to the invention is distinguished by a low residual current and low equivalent series resistance. As the polymeric outer layer forms a dense layer around the capacitor body and covers the edges thereof very well, the capacitor body is robust with respect to mechanical stresses. In addition, the polymeric outer layer exhibits good adhesion to the capacitor body and high electrical conductivity, so low equivalent series resistance may be achieved. The polymeric outer layer exhibits only a low degree of unevenness relative to the layer thickness. The outer layer according does not contain any thin regions at which high residual currents can occur.

The present invention preferably relates to electrolytic capacitors produced by the new process with an ESR measured at 100 kHz of less than 50 mΩ. The ESR of the electrolytic capacitors produced by the new process, measured at a frequency of 100 kHz, is particularly preferably less than 31 mΩ, more preferably less than 21 mΩ, most preferably less than 16 mΩ. In particularly preferred embodiments of the electrolytic capacitors, the ESR is less than 11 mΩ.

The equivalent series resistance of a solid electrolytic capacitor is inversely proportional to the geometric surface area of the capacitor. The product of the equivalent series resistance and the geometric surface area accordingly provides a variable that is independent of the overall size.

Therefore, the present invention also preferably relates to electrolytic capacitors produced by the new process in which the product of the equivalent series resistance, measured at 100 kHz, and the geometric surface area of the capacitor body is less than 4,000 mΩmm$^2$. The product of the equivalent series resistance and the geometric surface area is particularly preferably less than 3,000 mΩmm$^2$, more preferably less than 2,000 mΩmm$^2$, most preferably less than 1,000 mΩmm$^2$. In particularly preferred embodiments of the electrolytic capacitors, the product of the equivalent series resistance and the geometric surface area is less than 600 mΩmm$^2$.

An electrolytic capacitor according to the invention of this type can basically be produced as follows: firstly, a valve metal powder, for example, with a large surface area is pressed and sintered to form a porous electrode body. An electric contact wire made of the same metal as the powder, for example tantalum, is conventionally pressed into the electrode body. Metal foils may also be etched to obtain a porous foil.

The electrode body is then covered with a dielectric, i.e. an oxide layer, for example by electrochemical oxidation. A conductive polymer that forms the solid electrolyte is deposited chemically or electrochemically on the dielectric, for example by oxidative polymerisation. Precursors for producing conductive polymers, one or more oxidising agents and optionally counterions are accordingly applied, together or in succession, to the dielectric of the porous electrode body and are polymerised by chemical oxidation at temperatures, or precursors for producing conductive polymers and counterions are polymerised by electrochemical polymerisation on the dielectric of the porous electrode body. According to the invention, a layer containing at least one optionally substituted polyaniline and/or a polythiophene with recurring units of general formula (I), (II) or recurring units of general formulae (I) and (II) and at least one binder c) and solid particles e) are then applied from a dispersion to the capacitor body. Further layers are optionally applied to the polymeric outer layer. A coating with readily conductive layers, such as graphite and silver, or a metal cathode body is used as the electrode to discharge the current. Finally, the capacitor is contacted and encapsulated.

Precursors for producing conductive polymers, hereinafter also called precursors, are taken to mean corresponding monomers or derivatives thereof. Mixtures of different precursors may also be used. Suitable monomeric precursors include, for example, optionally substituted thiophenes, pyrroles or anilines, preferably optionally substituted thiophenes, particularly preferably optionally substituted 3,4-alkylenedioxythiophenes.

Examples of substituted 3,4-alkylenedioxythiophenes include compounds of general formula (III), (IV) or a mixture of thiophene of general formulae (III) and (IV)

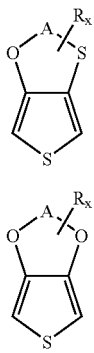

(III)

(IV)

wherein

A represents an optionally substituted $C_1$ to $C_5$ alkylene radical, preferably an optionally substituted $C_2$ to $C_3$ alkylene radical, R represents a linear or branched, optionally substituted $C_1$ to $C_{18}$ alkyl radical, preferably a linear or branched, optionally substituted $C_1$ to $C_{14}$ alkyl radical, an optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical, preferably optionally substituted $C_1$ to $C_2$ hydroxyalkyl radical, or a hydroxyl radical, x represents an integer from 0 to 8, preferably from 0 to 6, particularly preferably 0 or 1 and, if a plurality of radicals R are bound to A, these may be the same or different.

More particularly preferred monomeric precursors are optionally substituted 3,4-ethylenedioxythiophenes.

Examples of substituted 3,4-ethylenedioxythiophenes include the compounds of general formula (V)

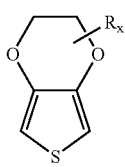

(V)

wherein R and x have the meaning given for general formulae (III) and (IV).

Derivatives of these monomeric precursors are understood, according to the invention, to include, for example, dimers or trimers of these monomeric precursors. Higher molecular derivatives, i.e. tetramers, pentamers, etc. of the monomeric precursors are also possible as derivatives.

The compounds of general formula (VI)

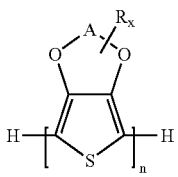

(VI)

are mentioned as examples of derivatives of substituted 3,4-alkylenedioxythiophenes, wherein n represents an integer from 2 to 20, preferably 2 to 6, particularly preferably 2 or 3, and A, R and x have the meaning given for general formulae (III) and (IV).

The derivatives may be made up of identical or different monomer units and used in pure form and in a mixture with one another and/or with the monomeric precursors. Oxidised or reduced forms of these precursors are also covered by the term "precursors" in the scope of the invention if, during the polymerisation thereof, the same conductive polymers are produced as in the precursors listed above.

$C_1$ to $C_5$ alkylene radicals A, within the scope of the invention, are methylene, ethylene, n-propylene, n-butylene or n-pentylene. $C_1$ to $C_{18}$ alkyls, in the scope of the invention, represent linear or branched $C_1$ to $C_{18}$ alkyl radicals such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$ to $C_{12}$ cycloalkyl radicals R represent, for example, cyclopentyl, cyclohexyl, cycloheptyl, cyclooctyl, cyclononyl or cyclodecyl, $C_5$ to $C_{14}$ aryl radicals R represent, for example, phenyl or naphthyl, and $C_7$ to $C_{18}$ aralkyl radicals represent, for example, benzyl, o-, m-, p-tolyl, 2,3-, 2,4-, 2,5-, 2-6, 3-4-, 3,5-xylyl or mesityl. The preceding list is used by way of example to illustrate the invention and should not be regarded as conclusive.

Radicals R and A can be substituted with numerous organic groups for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxylamide groups.

The radicals mentioned for R for general formulae (III) and (IV) may be considered as substituents for the above-mentioned precursors, in particular for the thiophenes, preferably for the 3,4-alkylenedioxythiophenes.

The above-mentioned radicals A and R and/or the further substituents for the radicals A and R may, for example, be considered as substituents for pyrroles and anilnes.

Processes for producing the monomeric precursors for producing conductive polymers and their derivatives are known to the person skilled in the art and described, for example, in L. Groenendaal, F. Jonas, D. Freitag, H. Pielartzik & J. R. Reynolds, Adv. Mater. 12 (2000) 481-494 and the literature cited therein.

The 3,4-alkyleneoxythiophenes of formula (III) required for producing the polythiophenes to be used are known to the person skilled in the art or may be produced by known processes (for example, according to P. Blanchard, A. Cappon, E. Levillain, Y. Nicolas, P. Frere and J. Roncali, Org. Lett. 4 (4), 2002, pp. 607-609).

The conductive polymers are preferably produced on the electrode body covered by a dielectric by oxidative polymerisation of precursors for producing conductive polymers, in that the precursors, oxidising agents and optionally counterions, preferably in the form of solutions, are applied, either separately in succession or together, to the dielectric of the electrode body, and oxidative polymerisation is completed, optionally by heating the coating, depending on the activity of the oxidising agent used.

Application to the dielectric of the electrode body may take place directly or using an adhesive, for example a silane, such as organofunctional silanes or their hydrolysates, for example 3-glycidoxypropyltrialkoxysilane, 3-aminopropyltriethoxysilane, 3-mercaptopropyltrimethoxysilane, 3-metacryloxypropyltrimethoxysilane, vinyltri-methoxysilane or octyltriethoxysilane, and/or one or more different functional layers.

Polymerisation by chemical oxidation of the thiophenes of formula (III) or (IV) is generally performed at temperatures of −10° C. to 250° C., preferably at temperatures of 0° C. to 200° C., depending on the oxidising agent used and desired reaction time.

The following organic solvents that are inert under the reaction conditions are primarily mentioned as solvents for the precursors for producing conductive polymers and/or oxidising agents and/or counterions: aliphatic alcohols such as methanol, ethanol, i-propanol and butanol; aliphatic ketones such as acetone and methylethylketone; aliphatic carboxylic acid esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulphoxides and sulphones such as dimethyl sulphoxide and sulpholane; aliphatic carboxylic acid amides such as methylacetamide, dimethylacetamide and dimethylformamide; aliphatic and araliphatic ethers such as diethylether and anisole. Water or a mixture of water with the above-mentioned organic solvents may also be used as the solvent.

Any metal salts suitable for oxidative polymerisation of thiophenes, anilines or pyrroles and known to the person skilled in the art may be used as the oxidising agents.

Suitable metal salts include metal salts of main and subgroup metals, the subgroup metals also being called transition metal salts hereinafter, of the periodic table of elements. Suitable transition metal salts include, in particular, salts of an inorganic or organic acid or inorganic acid of transition metals, such as iron(III), copper(II), chromium(VI), cerium(IV), manganese(IV), manganese(VII) and ruthenium(III), comprising organic radicals.

Preferred transition metal salts include those of iron(III). Conventional iron(III) salts are advantageously inexpensive, easily obtainable and may be easily handled, such as the iron(III) salts of inorganic acids, for example iron(III) halides (e.g. $FeCl_3$) or iron(III) salts of other inorganic acids, such as $Fe(ClO_4)_3$ or $Fe_2(SO_4)_3$ and the iron(III) salts of organic acids and inorganic acids comprising organic radicals.

The iron(III) salts of sulphuric acid monoesters of $C_1$ to $C_{20}$ alkanols, for example the iron(III) salt of lauryl sulphate, are mentioned as examples of the iron(III) salts of inorganic acids comprising organic radicals.

Particularly preferred transition metal salts include those of an organic acid, in particular iron(III) salts of organic acids.

Examples of iron(III) salts of organic acids include: iron (III) salts of $C_1$ to $C_{20}$ alkane sulphonic acids, such as methane, ethane, propane, butane or higher sulphonic acids such as dodecane sulphonic acid, of aliphatic perfluorosulphonic acids, such as trifluoromethane sulphonic acid, perfluorobutane sulphonic acid or perfluorooctane sulphonic acid, of aliphatic $C_1$ to $C_{20}$ carboxylic acids such as 2-ethylhexylcarboxylic acid, of aliphatic perfluorocarboxylic acids, such as trifluoroacetic acid or perfluorooctane acid and of aromatic sulphonic acids optionally substituted by $C_1$ to $C_{20}$ alkyl groups, such as benzene sulphonic acid, o-toluene sulphonic acid, p-toluene sulphonic acid or dodecylbenzene sulphonic acid and of cycloalkane sulphonic acids such as camphor sulphonic acid.

Any mixtures of these above-mentioned iron(III) salts of organic acids may also be used.

The use of the iron(III) salts of organic acids and of the inorganic acids comprising organic radicals has the great advantage that they are not corrosive.

Iron(III)-p-toluene sulphonate, iron(III)-o-toluene sulphonate or a mixture of iron(III)-p-toluene sulphonate and iron (III)-o-toluene sulphonate are more particularly preferred as the metal salts.

Peroxo compounds such as peroxodisulphates (persulphates), in particular ammonium and alkali peroxodisulphates, such as sodium and potassium peroxodisulphate, or alkali perborates—optionally in the presence of catalytic quantities of metal ions, such as iron, cobalt, nickel, molybdenum or vanadium ions—and transition metal oxides, such as manganese dioxide (manganese(IV) oxide) or cerium(IV) oxide are also suitable oxidising agents.

Theoretically, 2.25 equivalents of oxidising agents are required per mol of thiophene for the oxidative polymerisation of the thiophenes of formula (III) or (IV) (see for example J. Polym. Sc. Part A Polymer Chemistry vol. 26, p. 1287 (1988)). However, lower or higher equivalents of oxidising agents may also be used. According to the invention, one equivalent or more, particularly preferably two equivalents or more of oxidising agents is/are used per mol of thiophene.

With separate application of precursors, oxidising agents and optionally counterions, the dielectric of the electrode body is preferably initially coated with the solution of the oxidising agent and optionally of the counterions and then with the solution of the precursors. With the preferred joint application of precursors, oxidising agents and optionally counterions, the dielectric of the electrode body is coated with only one solution, namely a solution containing precursors, oxidising agents and optionally counterions.

Further components such as one or more organic binders soluble in organic solvents, such as polyvinyl acetate, polycarbonate, polyvinyl butyral, polyacrylic acid ester, polymethacrylic acid ester, polystyrene, polyacrylonitrile, polyvinylchloride, polybutadiene, polyisoprene, polyether, polyester, silicones, styrene/acrylic acid ester, vinyl acetate/acrylic acid ester and ethylene/vinyl acetate copolymers or water-soluble binders such as polyvinyl alcohols, crosslinking agents such as melamine compounds, masked isocyanates, functional silanes—for example tetraethoxysilane, alkoxysilane hydrolysates, for example based on tetraethoxysilane, epoxy silanes such as 3-glycidoxypropyltrialkoxysilane—polyurethanes, polyacrylates or polyolefin dispersions, and/or additives, such as surface-active substances, for example ionic or non-ionic surfactants or adhesives, such as organic functional silanes or their hydrolysates, for example 3-glycidoxypropyltrialkoxysilane, 3-aminopropyltriethoxysilane, 3-mercaptopropyltrimethoxysilane, 3-metacryloxypropyltrimethoxysilane, vinyltrimethoxysilane, octyltriethoxysilane, may also be added to the solutions.

The solutions to be applied to the dielectric of the electrode body preferably contain 1 to 30% by weight of the thiophene of general formula (III) or of the mixture of thiophenes of general formulae (III) and (IV) and 0 to 50% by weight binder, crosslinking agent and/or additives, both percentages by weight being based on the total weight of the mixture.

The solutions are applied by known processes, for example by impregnation, pouring, dropwise application, injection, spraying, doctoring, brushing, spin coating or printing, for example ink-jet, screen, contact or pad printing, onto the dielectric of the electrode body.

The solvents may be removed after application of the solutions by simple evaporation at ambient temperature. To achieve higher processing speeds it is, however, more advantageous to remove the solvents at elevated temperatures, for example at temperatures of 20 to 300° C., preferably 40 to 250° C. A thermal post-treatment may be directly connected with removal of the solvent or else also be performed following a delay after completion of the coating.

The duration of the heat treatment is 5 seconds to a plurality of hours, depending on the type of polymer used for the coating. Temperature profiles with different temperatures and dwell times may also be used for the thermal treatment.

The heat treatment may, for example, be carried out in such a way that the coated oxidised electrode bodies are moved at such speed through a heat chamber at the desired temperature that the desired dwell time is achieved at the selected temperature or it is brought into contact with a hot plate at the desired temperature for the desired dwell time. The heat treatment may also take place, for example, in a heating furnace or a plurality of heating furnaces with respectively different temperatures.

After removing the solvents (drying) and optionally after thermal post-treatment, it may be advantageous to wash out excess oxidising agents and residual salts from the coating using a suitable solvent, preferably water or alcohols. Residual salts are here taken to mean the salts of the reduced form of the oxidising agent and optionally further salts present.

For metal oxide dielectrics, such as the oxides of the valve metals, it may be advantageous, after polymerisation and preferably during or after washing, to electrochemically imitate the oxide film in order to touch up potential defects in the oxide film and consequently to reduce the residual current of the finished capacitor. During this reforming process the capacitor body is immersed in an electrolyte and a positive voltage applied to the electrode body. The flowing current imitates the oxide at defective points in the oxide film and destroys conductive polymer at defects over which a high current flows.

Depending on the type of oxidised electrode body, it may be advantageous to impregnate the oxidised electrode body several more times with the mixtures to achieve thicker polymer layers, preferably after a washing process.

The polythiophenes of the solid electrolyte may be produced from the precursors by electrochemical oxidative polymerisation as well.

During electrochemical polymerisation, the electrode body coated with a dielectric may firstly be coated with a thin layer of a conductive polymer. After applying a voltage to this layer, the layer containing the conductive polymer grows thereon. Other conductive layers may also be used as the deposition layer. Thus, Y. Kudoh et al describe, in Journal of Power Sources 60 (1996) 157-163, the use of a deposited layer of manganese oxide.

The electrochemical oxidative polymerisation of the precursors may be performed at temperatures of −78° C. up to the boiling point of the solvent used. Electrochemical polymerisation is preferably carried out at temperatures of −78° C. to 250° C., particularly preferably from −20° C. to 60° C.

The reaction time is 1 minute to 24 hours depending on the precursor used, the electrolyte used, the selected temperature and the current density applied:

If the precursors are liquid, electropolymerisation may be performed in the presence or absence of solvents that are inert under electropolymerisation conditions. The electropolymerisation of solid precursors is carried out in the presence of solvents that are inert under electrochemical polymerisation conditions. In certain cases it may be advantageous to use solvent mixtures and/or to add solubilisers (detergents) to the solvents.

Examples of solvents that are inert under electropolymerisation conditions include: water; alcohols such as methanol and ethanol; ketones such as acetophenone; halogenated hydrocarbons such as methylenechloride, chloroform, carbon tetrachloride and fluorocarbons; esters such as ethyl acetate and butyl acetate; carbonic acid esters such as propylene carbonate; aromatic hydrocarbons such as benzene, toluene, xylene; aliphatic hydrocarbons such as pentane, hexane, heptane and cyclohexane; nitriles such as acetonitrile and benzonitrile; sulphoxides such as dimethylsulphoxide; sulphones such as dimethylsulphone, phenylmethylsulphone and sulpholane; liquid aliphatic amides such as methylacetamide, dimethylacetamide, dimethylformamide, pyrrolidone, N-methylpyrrolidone, N-methylcaprolactam; aliphatic and mixed aliphatic-aromatic ethers such as diethylether and anisole; liquid ureas such as tetramethylurea or N,N-dimethylimidazolidinone.

For electropolymerisation, electrolyte additives are added to the precursors or their solutions. Free acids or conventional support electrolytes, which have some solubility in the solvents used, are preferably used as the electrolyte additives. Free acids, such as p-toluene sulphonic acid, methane sulphonic acid, and salts with alkane sulphonate, aromatic sulphonate, tetrafluoroborate, hexafluorophosphate, perchlorate, hexafluoroantimonate, hexafluoroarsenate and hexachloroantimonate anions and alkali, alkaline earth or optionally alkylated ammonium, phosphonium, sulphonium and oxonium cations, for example, have proven themselves as electrolyte additives.

The concentrations of the precursors can lie between 0.01 and 100% by weight (100% by weight only with liquid precursor); the concentrations are preferably 0.1 to 20% by weight.

Electropolymerisation may be carried out discontinuously or continuously.

The current densities for electropolymerisation may vary within wide limits; current densities of 0.0001 to 100 mA/cm$^2$, preferably 0.01 to 40 mA/cm$^2$ are conventionally employed. Voltages of about 0.1 to 50 V are obtained with these current densities.

For metal oxide dielectrics it may be advantageous, after electrochemical polymerisation, to electrochemically imitate the oxide film in order to touch up potential defects in the oxide film and consequently reduce the residual current of the finished capacitor (reforming).

The monomeric or polymeric anions already mentioned hereinbefore are suitable as counterions, preferably those of the monomeric or polymeric alkane or cycloalkane sulphonic acids or aromatic sulphonic acids. The anions of monomeric alkane or cycloalkane sulphonic acids or aromatic sulponic acids are particularly preferred for application in the electrolytic capacitors according to the invention, as these contained solutions are more capable of penetrating into the porous electrode material coated with a dielectric so a larger contact area between this and the solid electrolyte may be formed. The counterions are added to the solutions, for example in the form of their alkali metal salts or as free acids. During electrochemical polymerisation these counterions are added to the solution or the thiophenes, optionally as electrolyte additives or support electrolytes.

In addition, the optionally present anions of the oxidising agent used may be used as counterions, so an addition of additional counterions is not imperative in the case of chemical oxidative polymerisation.

After producing the solid electrolyte, the polymeric outer layer is applied as described above.

The addition of binders has the great advantage that the adhesion of the outer polymer layer to the capacitor body is increased. The binder also binds the solid particles in the polymeric outer film. The solid particles, the size of which varies from 0.7 µm to 20 µm, enable the dispersion completely to cover even edges and corners with an adequate outer layer.

The dispersions a) may also contain crosslinking agents, surface-active substances, such as ionic or non-ionic surfactants or adhesives, and/or additives. The crosslinking agents, surface-additive substances and/or additives listed above with respect to the solid electrolyte may be used.

The dispersions a) preferably contain further additives that increase the conductivity, for example ether group-containing compounds, such as tetrahydrofuran, lactone group-containing compounds such as γ-butyrolactone, γ-valerolactone, amide or lactam group-containing compounds such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as sulpholane (tetramethylenesulphone), dimethylsulphoxide (DMSO), sugar or sugar derivatives, such as saccharose, glucose, fructose, lactose, sugar alcohols, such as sorbitol, mannitol, furan derivatives, such as 2-furancarboxylic acid, 3-furancarboxylic acid, and/or di- or polyalcohols, such as ethylene glycol, glycerol, di- or triethylene glycol. Tetrahydrofuran, N-methylformamide, N-methylpyrrolidone, ethylene glycol, dimethylsulphoxide or sorbitol are particularly preferably used as the conductivity-increasing additives.

The dispersions a) may have a pH from 1 to 14, a pH from 1 to 8 being preferred. For corrosion-sensitive dielectrics, for example aluminium oxides, dispersions having a pH from 4 to 8 are preferred, so the dielectric is not damaged.

The dispersions are preferably thixotropic, to facilitate good edge and corner coverage of the capacitor bodies.

The dispersions are produced from optionally substituted anilines, thiophenes of general formula (III), (IV) or mixtures of thiophenes of general formulae (III) and (IV), for example analogously to the conditions mentioned in EP-A 440 957. The oxidising agents and solvents listed above may be used. The diameter distribution of the particles b) may be adjusted, for example, by high-pressure homogenisation.

Production of the polyaniline/polyanion or polythiophene/polyanion complex and subsequent dispersal or redispersal in one or more solvent(s) is also possible.

The dispersions are applied by known processes, for example by spin coating, impregnation, pouring, dropwise application, injection, spraying, doctoring, brushing or printing, for example ink-jet, screen or pad printing, onto the capacitor body.

The viscosity of the dispersion a) can be between 0.1 and 100,000 mPa·s (measured at a shear rate of 100 s$^{-1}$), depending on the type of application. The viscosity is preferably 1 to 10,000 mPa·s, particularly preferably between 10 and 1,500 mPa·s, more particularly preferably 100 to 1000 mPa·s.

When applying the dispersion a) to the capacitor body by means of steeping, it may be advantageous to allow a thin film of higher viscosity to form on the surface of the dispersion a) prior to steeping. If the capacitor body is then immersed successively deeper into a dispersion a) of this type in one or more steeping and drying cycles, coverage of the edges and corners of the capacitor body is much improved and blistering in the dry polymer film is prevented. The capacitor body can thus, for example, be steeped only half-way in the dispersion a) in the first step and then dried. In a second steeping step the capacitor body can then be completely immersed in the dispersion a) and then dried. The formation of the thin film of higher viscosity on the surface of the dispersion a) can be achieved for example by simply allowing it to stand in the open atmosphere. Film formation may be accelerated, for example by heating the dispersion a) or by heating the dispersion surface with hot air or heat irradiation.

Dispersions a) that, in the dry state, have specific conductivity higher than 1 S/cm, particularly preferably higher than 10 S/cm, more preferably higher than 20 S/cm and most preferably higher than 50 S/cm are preferably used.

Drying, cleaning of the layer by washing, reforming and repeated application, as already described above for the production of solid electrolytes, may also follow application of the polymeric outer layer. In the event of a drying process, the dispersing agent d) is preferably removed. However, it is also possible for at least a portion of the dispersing agent d) to remain in the polymeric outer layer. Depending on the binder c) or crosslinking agent used, further treatment steps, such as curing or crosslinking by temperature or light, may also be employed. Further layers may also be applied to the polymeric outer layer.

It has surprisingly been found that for metal oxide dielectrics, no further treatment steps of the layer are required after application and drying of the dispersion a) in order to produce solid electrolytic capacitors with low ESR and low residual current. In other processes for producing a polymeric outer layer, the oxide layer has conventionally to be reformed after application of the conductive polymeric outer layer to achieve low residual currents. The polymeric outer layer may detach from the capacitor body at certain points as a result of this reforming in an electrolyte, whereby the ESR is increased. When using the process according to the invention, the reforming process may be dispensed with, without the residual current being increased thereby.

Preferably, once the polymeric outer layer has been produced, any further readily conductive layers, for example graphite and/or silver layers, are applied to the capacitor, the capacitor is contacted and encapsulated.

The valve metals or compounds with comparable electrical properties listed above for the electrolytic capacitor are preferably used for producing the electrode body. Preferred ranges apply accordingly.

The oxidisable metals are, for example, sintered in powdered form to form a porous electrode body, or a porous structure is impressed on a metal body. This may also be carried out, for example, by etching a foil.

The porous electrode bodies are, for example, oxidised in a suitable electrolyte, such as phosphoric acid, by applying a voltage. The level of this forming voltage is dependent on the oxide layer thickness to be achieved or the subsequent application voltage of the capacitor. Preferred voltages are 1 to 300 V, particularly preferably 1 to 80 V.

Preferably, metal powders with a charge-mass ratio higher than 35,000 µC/g, particularly preferably with a charge-mass ratio higher than 45,000 µC/g, more preferably with a charge-mass ratio higher than 65,000 µC/g, most preferably with a charge-mass ratio higher than 95,000 µC/g are used for producing the electrode body. Metal powders with a charge-mass ratio higher than 140,000 µC/g are used in preferred embodiments of the process according to the invention.

The charge-mass ratio is calculated here as follows:

Charge-mass ratio=(capacitance*voltage)/weight of the oxidised electrode body

The capacitance is obtained here from the capacitance of the oxidised electrode body, measured at 120 Hz in an aqueous electrolyte. The electric conductivity of the electrolyte is sufficiently great here, so there is still no capacitance drop at 120 Hz owing to the electric resistance of the electrolyte. 18% aqueous sulphuric acid electrolytes are used, for example, for measuring. The voltage in the above formula corresponds to the maximum forming voltage (oxidation voltage).

Solid electrolytic capacitors with a dense polymeric outer layer with a good edge coverage and adhesion may be produced particularly simply using the process according to the invention. The capacitors are also distinguished by low residual currents and a low ESR.

The electrolytic capacitors produced according to the invention are eminently suitable as a component in electronic circuits owing to their low residual current and their low ESR. The invention also relates to the use of such capacitors. Digital electronic circuits of the type found, for example, in computers (desktops, laptops, servers), in portable electronic devices, such as mobile telephones and digital cameras, in electronic entertainment equipment, such as in CD/DVD players and computer games consoles, in navigation systems and in telecommunication devices, are preferred.

EXAMPLES

Example 1

Preparation of a Dispersion According to the Invention

Preparation of Conductive Particles b)

868 g deionised water, 330 g of an aqueous polystyrene sulphuric acid solution having an average molecular weight of 70,000 and a solids content of 3.8% by weight were placed in a 2-l three-necked flask with stirrer and internal thermometer. The reaction temperature was maintained between 20 and 25° C.

5.1 g 3,4-ethylenedioxythiophene were added while stirring. The solution was stirred for 30 minutes. 0.03 g iron(III) sulphate and 9.5 g sodium persulphate were then added and the solution was stirred for a further 24 hours.

Once the reaction has been completed, 100 ml of a strongly acid cation exchanger and 250 ml of a weakly basic anion exchanger were added, for removing inorganic salts, and the solution was stirred for a further two hours. The ion exchanger was filtered out.

The resulting poly(3,4-ethylenedioxythiophene)/polystyrene sulphonate dispersion had a solids content of 1.2% by weight and the following particle diameter distribution:

|     |        |
| --- | ------ |
| d10 | 100 nm |
| d50 | 141 nm |
| d90 | 210 nm |

The diameter distribution of the particles b) of the conductive polymer relates to a mass distribution of the particles b) in the dispersion as a function of the particle diameter. The diameter was determined by ultracentrifuge measuring.

Preparation of Solid Particle e) (PEDT-toluene Sulphonate Powder)

2.5 l demineralised water were placed in a 5-l glass reactor with stirrer and thermometer. 214.2 g p-toluene sulphonic acid monohydrate and 2.25 g iron(III) sulphate heptahydrate were introduced while stirring. Once the entire mixture had dissolved, 85.8 g 3,4-ethylenedioxythiophene were added and stirring was continued for 30 minutes. 192.9 sodium peroxide sulphate were then introduced while stirring, and the mixture was stirred for a further 24 hours at ambient temperature. After the end of the reaction, the PEDT/toluene sulphonate powder was filtered out on a porcelain suction filter, washed with 3 l demineralised water and finally dried for 6 hours at 100° C. 89 g of a bluish black PEDT toluene sulphonate powder were obtained.

Preparation of a Dispersion a) According to the Invention

In a beaker with stirrer, 170 g PEDT/PSS dispersion prepared according to Example 1.1, 15 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. 6 g PEDT/toluene sulphonate powder (prepared according to Example 1.2) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-μm sieve. The dispersion had a solids content of 7.0%.

Example 2

Production of Capacitors

Production of Oxidised Capacitors

Tantalum powder with a specific capacitance of 50,000 μFV/g was compacted into pellets, a tantalum wire 7 being included, and sintered to form a porous electrode body 2 with dimensions of 4.2 mm*3 mm*1.6 mm. The electrode bodies 2 were anodised in a phosphoric acid electrolyte to 30 V.

Chemical In Situ Coating of the Electrode Bodies

A solution composed of 1 part by weight 3,4-ethylenedioxythiophene (BAYTRON® M, H. C. Starck GmbH) and 20 parts by weight of a 40% by weight ethanolic solution of iron(III)-p-toluenesulphonate (BAYTRON® C-E, H. C. Starck GmbH) was produced.

The solution was used to impregnate nine anodised electrode bodies 2. The electrode bodies 2 were steeped in this solution and then dried for 30 min at ambient temperature (20° C.). They were then heat treated for 30 min at 50° C. in a drying oven. The electrode bodies were then washed for 30 min in a 2% by weight aqueous solution of p-toluic acid. The electrode bodies were reformed for 30 min in a 0.25% by weight aqueous solution of p-toluene-sulphonic acid, then rinsed in distilled water and dried. The described steeping, drying, heat treatment and reforming were carried out two further times using the same electrode bodies.

Production of a Polymeric Outer Layer

The nine electrode bodies, which were coated in-situ, were then steeped once in the dispersion according to the invention from Example 1.3 and subsequently dried for 10 min at 120° C.

After application of the polymeric outer layer 5, the electrode bodies were observed under a light microscope: the entire external surface of the electrode bodies was covered with a dense polymer film. The corners and edges also exhibited a continuous polymer film coating. The thickness of the polymeric external film was approximately 40 μm.

The electrode bodies were then coated with a graphite and silver layer.

Comparison Example 1

Preparation of a Dispersion not According to the Invention

In a beaker with stirrer, 170 g PEDT/PSS dispersion prepared according to Example 1.1, 15 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent. (Dynol 604, Air Products) were mixed intensively for one hour.

Production of Capacitors

Oxidised electrode bodies were produced and coated in-situ analogously to Examples 2.1 and 2.2. The nine electrode bodies were then steeped once in the dispersion from Example 2.4 and subsequently dried for 10 min at 120° C.

After application of the polymeric outer layer 5, the electrode bodies were observed under a light microscope: the electrode bodies comprising the polymeric outer layer 5 exhibited, in particular, no polymer film coating at the corners and edges of the anode.

The electrode bodies were then coated with a graphite and silver layer.

The nine capacitors from Example 2 and Comparison Example 1 each had, on average, the following electrical residual currents:

|  | Residual current [µA] | Coating with polymeric outer layer |
| --- | --- | --- |
| Example 2 (dispersion according to the invention) | 11.6 | 110% |
| Comparison Example 1 | 64.8 | Corners and edges exposed |

The residual current was determined for three minutes using a Keithley 199 multimeter after applying a 10 V voltage.

Owing to the improved coating with a polymeric outer layer 5, the capacitors produced by the process according to the invention, using dispersions containing solid particles e), exhibited significantly lower residual currents. In the process not according to the invention, with dispersions containing no solid particles e), the graphite and silver layers entered into direct contact with the dielectric, thus producing a high residual current.

Example 3

Preparation of a Dispersion According to the Invention

In a beaker with stirrer, 180 g PEDT/PSS dispersion prepared according to Example 1.1, 10 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. 2 g PEDT/toluene sulphonate powder (prepared according to Example 1.2) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-µm sieve. The dispersion had a solids content of 4.7%.

The distribution of the solid particles in the dispersion was determined by laser diffraction (MS 2000 Hydro S). The following diameter distribution values were obtained:

$d_{10}$: 1.5 µm
$d_{50}$: 3.0 µm (average diameter)
$d_{90}$: 6.6 µm

Example 4

Preparation of a Dispersion According to the Invention

In a beaker with stirrer, 180 g PEDT/PSS dispersion prepared according to Example 1.1, 10 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. 2 g of a precipitated silica (Acematt OK 607, Degussa, average particle diameter 4.5 µm) were then added and the mixture was stirred for one hour using a dissolver (disc diameter 6 cm, 5000 rpm) with cooling. The dispersion thus obtained had a solids content of 4.2%.

Example 5

Preparation of a Dispersion According to the Invention

In a beaker with stirrer, 180 g PEDT/PSS dispersion prepared according to Example 1.1, 10 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. 2 g of a pyrogenic silica (Acematt TS 100, Degussa, average particle diameter 10 µm) were then added and the mixture was stirred for one hour using a dissolver (disc diameter 6 cm, 5000 rpm) with cooling. The dispersion thus obtained had a solids content of 4.3%

Comparison Example 2

In a beaker with stirrer, 180 g PEDT/PSS dispersion prepared according to Example 1.1, 10 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. 2 g of a pyrogenic silica (Acematt TS 100, Degussa, average particle diameter 0.012 µm) were then added and the mixture was stirred for one hour using a dissolver (disc diameter 6 cm, 5000 rpm) with cooling. The dispersion thus obtained had a solids content of 4.2%.

Oxidised electrode bodies were produced and coated in-situ analogously to Examples 2.1 and 2.2. All nine electrode bodies were then steeped once in the dispersion from Examples 3, 4 and 5 and Comparative Example 2, and were then dried for 10 min at 120° C.

After application of the polymeric outer layer 5, the electrode bodies were observed under a light microscope, and the coating with the polymeric outer layer 5 was visually assessed.

The electrode bodies were then coated with a graphite and silver layer.

The residual current was determined for three minutes using a Keithley 199 multimeter after applying a 10 V voltage. The equivalent series resistance (ESR) was determined at 100 kHz using an LCR meter (Agilent 4284A).

| | Average diameter of the solid particles [µm] | Coverage | Residual current [µA] | ESR [mΩ] |
|---|---|---|---|---|
| Example 3 | 3 | 100% | 7 | 17.1 |
| Example 4 | 4.5 | 100% | 6 | 16.0 |
| Example 5 | 10 | 100% | 10 | 15.5 |
| Comparison Example 2 | 0.012 | Corners and edges exposed | 78 | 17.7 |

The capacitors produced by the process according to the invention (Examples 3, 4 and 5) exhibited a 100-% coverage with an outer polymer film and a low residual current. Very fine solid particles in the dispersion from which the polymeric external film is produced do not lead to good coverage (Comparison Example 2). In particular, the corners and edges of the electrode bodies were, in this case, exposed, resulting in a high residual current.

Example 6

Preparation of a Dispersion According to the Invention

In a beaker with a stirrer, 182.2 g PEDT/PSS dispersion, prepared according to Example 1.1, 1.1 g dimethylethanolamine (50% solution in water), 6.4 g of a Novolak epoxy resin (EPI-REZ 6006 W-70, Resolution), 10 g ethylene glycol, 1 g 3-glycidoxypropyltrimethoxysilane (Silquest A-187, OSi Specialties) and 0.4 g of a wetting agent (Surfynol E-104, Air Products) were mixed intensively for one hour. 4 g PEDT/toluene sulphonate powder (prepared according to Example 1.2) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-µm sieve. The dispersion had a solids content of 4.8%.

Comparison Example 3

Preparation of a Dispersion not According to the Invention

A dispersion was prepared analogously to Example 6, but without the addition and the dispersion of PEDT/toluene sulphonate powder.

Example 7

Preparation of a Dispersion According to the Invention

In a beaker with a stirrer, 161.6 g PEDT/PSS dispersion, prepared according to Example 1.1, 30 g of a perfluorosulphonic acid/tetrafluoroethylene copolymer (Liquion 1115, Ion Power), 8 g dimethyl sulphoxide and 0.4 g of a wetting agent (Zonyl FS-300, DuPont) were mixed intensively for one hour. 5 g PEDT/toluene sulphonate powder (prepared according to Example 1.2) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-µm sieve. The dispersion had a solids content of 5.8%.

Comparison Example 4

Preparation of a Dispersion not According to the Invention

A dispersion was prepared analogously to Example 7, but without the addition and the dispersion of PEDT/toluene sulphonate powder.

Example 8

Preparation of a Dispersion According to the Invention

In a beaker glass with a stirrer, 186.6 g PEDT/PSS dispersion, prepared according to Example 1.1, 1.1 g dimethylethanolamine (50% solution in water), 5.0 g of an aqueous phenolic resin dispersion (Phenodur VPW 1942, Cytec Industries) 8 g dimethyl sulphoxide and 0.4 g of a wetting agent (Dynol 604, Air Products) were mixed intensively for one hour. 5 g PEDT/toluene sulphonate powder (prepared according to Example 1.1) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-µm sieve. The dispersion had a solids content of 5.5% and a pH of 6.8.

Comparison Example 5

Preparation of a Dispersion not According to the Invention

A dispersion was prepared analogously to Example 8, but without the addition and the dispersion of PEDT/toluene sulphonate powder.

Example 9

Preparation of a Dispersion According to the Invention

In a beaker with a stirrer, 183 g PEDT/PSS dispersion, prepared according to Example 1.1, 8.6 g of an aqueous dispersion of an acrylate copolymer (Carbopol Aqua 30, Noveon), 8 g ethylene glycol and 0.4 g of a wetting agent (Dynol 604, Air Products) were mixed intensively for one hour. 5 g PEDT/toluene sulphonate powder (prepared according to Example 1.1) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-µm sieve. The dispersion had a solids content of 5.0%.

Comparison Example 6

Preparation of a Dispersion not According to the Invention

A dispersion was prepared analogously to Example 9, but without the addition and the dispersion of PEDT/toluene sulphonate powder.

Oxidised electrode bodies were produced and coated in-situ analogously to Examples 2.1 and 2.2. Electrode bodies were subsequently steeped once, in each case, in one of the dispersions from Examples 6 to 9 or the dispersion from Comparison Examples 3 to 6 and then dried for 10 min at 120° C.

After application of the polymeric outer layer 5, the electrode bodies were observed under a light microscope, and the coverage with the polymeric outer layers was visually assessed.

|  | Coverage |
| --- | --- |
| Example 6 | 110% |
| Comparison Example 3 | Corners and edges exposed |
| Example 7 | 100% |
| Comparison Example 4 | Corners and edges exposed |
| Example 8 | 100% |
| Comparison Example 5 | Corners and edges exposed |
| Example 9 | 100% |
| Comparison Example 6 | Corners and edges exposed |

After application to the electrode bodies, the formulations according to the invention from Examples 6 to 9 all formed a polymeric outer layer covering 100% of the electrode bodies. After coating with the formulations not according to the invention from Comparison Examples 3 to 6, which do not contain any solid particles e), the edges and corners of the electrode bodies are exposed.

Example 10

Preparation of a Dispersion According to the Invention

In a beaker with stirrer, 180 g PEDT/PSS dispersion prepared according to Example 1.1, 10 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. 2 g PEDT/toluene sulphonate powder (prepared according to Example 1.2) were then dispersed using a bead mill dissolver unit. For this purpose, 300 g of zirconium oxide beads (Ø 1 mm) were added and the mixture was stirred at 7000 rpm for one hour, while being cooled with water. Finally, the ground beads were separated via a 0.8-μm sieve. A viscosity of 390 mPas, measured at 100 Hz using a Haake Rotovisco 1, was then adjusted by evaporating water by vacuum.

Comparison Example 7

Preparation of a Dispersion not According to the Invention

In a beaker with stirrer, 180 g PEDT/PSS dispersion prepared according to Example 1.1, 10 g of a sulphopolyester (Eastek 1100, Eastman), 8 g dimethyl sulphoxide, 1 g 3-glycidoxypropyltrimethoxysilane (Silquest A-187, OSi Specialities) and 0.4 g of wetting agent (Dynol 604, Air Products) were mixed intensively for one hour. A viscosity of 360 mPas, measured at 100 Hz using a Haake Rotovisco 1, was then adjusted by evaporating water by vacuum.

Oxidised electrode bodies made from aluminium, consisting of a roughened and oxidised aluminium foil having dimensions of 4 mm*4 mm*1 mm, were subsequently steeped in the dispersion according to the invention from Example 10 or in the dispersion not according to the invention from Comparison Example 7, then dried for 10 min at 120° C., and steeped and dried again. After application of the polymeric outer layer 5, the electrode bodies were observed under a light microscope, and the coverage with polymeric outer layer 5 was visually assessed: the electrode bodies coated with the dispersion from Example 10 exhibited complete coverage of all edges. The electrode bodies coated with the dispersion from Comparison Example 7 did not exhibit any polymer film on the edges. The dispersions according to the invention accordingly allow even very sharp edges, such as occur in electrode bodies made from foils, to be covered highly effectively.

Oxidised electrode bodies were produced and coated in-situ analogously to Examples 2.1 and 2.2. Electrode bodies were, in each case, subsequently steeped once in the dispersion from Example 10 or from Comparison Example 7 and then dried for 10 min at 120° C. After application of the polymeric outer layer 5, the electrode bodies were observed under a light microscope, and the coverage with the polymeric outer layer 5 was visually assessed: the electrode bodies coated with the dispersion from Example 10 were distinguished by a homogenous polymeric outer layer. The electrode bodies coated with the dispersion from Comparison Example 7 exhibited craters and cracks in the polymeric outer film. The dispersions according to the invention allow the use of high viscosities for coating purposes, without cracks or craters thereby being formed.

Example 11

Production of Aluminium Capacitors

A solution composed of 1 part by weight 3,4-ethylenedioxythiophene (BAYTRON® M, H. C. Starck GmbH) and 20 parts by weight of a 40% by weight ethanolic solution of iron(III)-p-toluenesulphonate (BAYTRON® C-E, H. C. Starck GmbH) was produced. The solution was used to impregnate 12 oxidised electrode bodies made from etched and anodised aluminium foil having dimensions of 4 mm*4 mm*1 mm. The oxidised electrode bodies were steeped in this solution and then dried for 30 min at ambient temperature (20° C.). They were then heat treated for 30 min at 50° C. in a drying oven. The electrode bodies were subsequently washed in water for 30 min and then dried.

A dispersion according to Example 10 was prepared. The pH of the dispersion was adjusted to 6.7 by adding trimethylethanolamine. The electrode bodies were steeped in the dispersion, then dried for 10 min at 120° C., then steeped and dried again. The electrode bodies were then coated with a graphite and silver layer.

The twelve aluminium capacitors had, on average, the following electrical values

| Capacitance: | 3.5 μF |
| --- | --- |
| ESR: | 73 mΩ |
| Residual current: | 7 μA |

The residual current was determined for three minutes using a Keithley 199 multimeter after applying a 6 V voltage. The capacitance was determined at 120 Hz and the equivalent series resistance (ESR) at 100 kHz using an LCR meter (Agilent 4284 A).

Example 12

Measurement of the Average Unevenness of the Polymeric outer layer

Oxidised electrode bodies were produced and coated in-situ analogously to Examples 2.1 and 2.2. A portion of the electrode bodies was subsequently steeped once in the dispersion from Example 10 and then dried for 10 min at 120° C.

The average unevenness of the coated electrode bodies was determined using a Tencor Alpha Step 500 Surface Profiler. For those electrode bodies that were coated only in-situ, it was 0.4 µm. For those electrode bodies that were additionally coated with the dispersion according to the invention, the average unevenness was 0.5 µm. Although the dispersion according to the invention contains solid particles e), it does not increase the unevenness of the electrode bodies significantly. The particles b) of the electrically conductive polymer fill the gaps in the solid particles and therefore lead to smoothing of the polymeric outer film.

Example 13

Production of a Conductive Layer

A conductive layer was produced from the dispersion from Example 1.3 and from the dispersion from Example 10. For this purpose, a portion of the dispersion was spun onto a glass object carrier (26 mm*26 mm*1 mm) using a spin coater (Chemat Technology KW-4A) at 1,000 rpm for 5 seconds. The sample was dried for 10 min at 120° C. Two opposing edges of the object carrier were then coated with conducting silver. After drying of the conducting silver, the two silver strips were contacted and the surface resistance ascertained using a Keithley 199 multimeter. The layer thickness was determined using a Tencor Alpha Step 500 Surface Profiler. The specific conductivity was ascertained from surface resistance and layer thickness.

The following layer thickness and electrical conductivity values were obtained:

|  | Layer thickness [µm] | Conductivity [S/cm] |
|---|---|---|
| Example 1.3 | 1.5 | 28 |
| Example 10 | 1.3 | 63 |

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. A process for the production of an electrolytic capacitor which comprises
applying a dispersion a) to a capacitor body wherein said capacitor body comprises
a porous electrode body of an electrode material,
a dielectric covering the surface of this electrode material,
a solid electrolyte at least comprising a conductive material, that wholly or partially covers the dielectric surface,
and said dispersion a) comprises at least
particles b) of an electrically conductive polymer containing at least one optionally substituted polyaniline and/or one polythiophene with recurring units of general formula (I) or formula (II) or recurring units of general formulae (I) and (II)

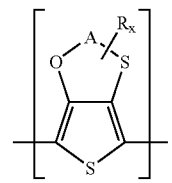

(I)

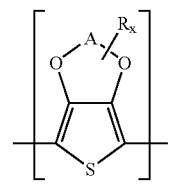

(II)

wherein
A represents an optionally substituted $C_1$ to $C_5$ alkylene radical,
R represents a linear or branched, optionally substituted $C_1$ to $C_{18}$ alkyl radical, an
optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical or a hydroxyl radical,
x represents an integer from 0 to 8 and
if a plurality of radicals R are bound to A, these may be the same or different,
and containing a binder c) and a dispersing agent d),
and, for forming an electrically conductive polymeric outer layer, the dispersing agent d) is optionally at least partially removed and/or the binder c) is cured,
wherein the proportion of the particles b) of the conductive polymer in the dispersion a) having a diameter of less than 700 nm forms a solids content of at least 5% by weight of the solids content of the dispersion,
and in that, in addition to the components b) to d), solid particles e) having a diameter in the range from 0.7 to 20 µm are also contained in the dispersion.

2. The process according to claim 1, wherein the particles b) of the conductive polymer in the dispersion a) have an average diameter from 5 to 500 nm.

3. The process according to claim 1, wherein the solid particles e) are based on electrically conductive polymer.

4. The process according to claim 1, wherein the solid particles e) are based on fillers.

5. The process according to claim 4, wherein the fillers are carbonates, silicates, silica, calcium sulphate, barium sulphate, aluminium hydroxide, glass fibres, glass bulbs, wood flour, cellulose powder, carbon black, silicon oxides or silicon dioxides.

6. The process according to claim 4, wherein the fillers are calcium carbonate, carbon, graphite, carbon black, metals, metal oxides, ceramics, silicates, silicon, quartz, glass, precipitated silicas, pyrogenic silicas or silica sols.

7. The process according to claim 1, wherein the polythiophene of the particles b) in the dispersion a) is poly(3,4-ethylenedioxythiophene).

8. The process according to claim 1, wherein the dispersion a) additionally contains at least one polymeric anion.

9. The process according to claim 8, wherein the polymeric anion is an anion of a polymeric carboxylic or sulphonic acid.

10. The process according to claim 8, wherein said polymeric anion is polystyrene sulphonic acid wherein the ratio of the solids content (% per weight) of the binder c) to the solids content of the solid particles e) is greater than 1:1, the proportion of particles e) in the dispersion a) is at least 15% by weight of the solids content of the dispersion a) and the solid particles e) in the dispersion a) have an average diameter from 1 μm to 5 μm, and the solid particles e) in the dispersion a) have a diameter distribution d10 value of greater than 1.2 μm and a d90 value of less than 8 μm, in the dispersion a), the proportion of the particles b) having a diameter of less than 700 nm, based on their solids content, is at least 15% by weight of the solids content of the dispersion and the proportion of the particles b) having a diameter of less than 400 nm, based on their solids content, is at least 15% by weight of the solids content of the dispersion.

11. The process according to claim 1, wherein the binder c) contained in the dispersion a) is a polymeric organic binder.

12. The process according to claim 1, wherein the ratio of the solids content (% per weight) of the binder c) to the solids content of the solid particles e) is greater than 1:2.

13. The process according to claim 1, wherein the dispersion a) is adjusted to a pH from 1 to 8 prior to application.

14. The process according to claim 1, wherein the viscosity of the dispersion a) is from 10 to 1500 mPas (measured at a shear rate of 100 s$^{-1}$).

15. The process according to claim 1, wherein the dispersing agent d) contained in the dispersion a) is an organic solvent, water or mixtures of organic solvent and water.

16. The process according to claim 1, wherein the dispersion a) additionally contains crosslinking agents and/or surface-active substances and/or further additives.

17. The process according to claim 16, wherein the further additives contained in the dispersion a) are ether, lactone, amide or lactam group-containing compounds, sulphones, sulphoxides, sugars, sugar derivatives, sugar alcohols, furan derivatives and/or di- or polyalcohols.

18. The process according to claim 1, wherein in a pH-sensitive dielectric, the dispersion a) is adjusted to a pH from 4 to 8.

19. The process according to claim 1, wherein the proportion of particles e) in the dispersion a) is at least 5% by weight of the solids content of the dispersion a).

20. The process according to at claim 1, wherein, in the dispersion a), the proportion of the particles b) having a diameter of less than 700 nm, based on their solids content, is at least 10% by weight of the solids content of the dispersion.

21. The process according to claim 1, wherein, in the dispersion a), the proportion of the particles b) having a diameter of less than 500 nm based on their solids content, is at least 5% by weight of the solids content of the dispersion.

22. The process according to claim 1, wherein the solid particles e) in the dispersion a) have an average diameter from 1 μm to 10 μm.

23. The process according to claim 1, wherein the solid particles e) in the dispersion a) have a diameter distribution d10 value of greater than 0.9 μm and a d90 value of less than 15 μm.

24. The process according to claim 1, wherein the conductive material of the solid electrolyte is a conductive polymer.

25. The process according to claim 24, wherein the conductive polymer contained in the solid electrolyte is a polythiophene, polypyrrole or polyaniline, which are optionally substituted.

26. The process according to claim 25, wherein the conductive polymer contained in the solid electrolyte is a polythiophene with recurring units of general formula (I) or formula (II), or recurring units of general formulae (I) and (II),

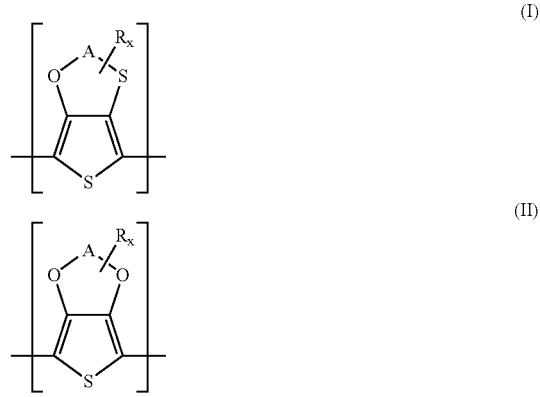

wherein A represents an optionally substituted $C_1$ to $C_5$ alkylene radical,

R represents a linear or branched, optionally substituted $C_1$ to $C_{18}$ alkyl radical, an optionally substituted $C_5$ to $C_{12}$ cycloalkyl radical, an optionally substituted $C_6$ to $C_{14}$ aryl radical, an optionally substituted $C_7$ to $C_{18}$ aralkyl radical, an optionally substituted $C_1$ to $C_4$ hydroxyalkyl radical or a hydroxyl radical, x represents an integer from 0 to 8 and if a plurality of radicals R are bound to A, these may be the same or different.

27. The process according to claim 26, wherein the conductive polymer contained in the solid electrolyte is poly(3,4-ethylenedioxythiophene).

28. The process according to claim 1, wherein the solid electrolyte contains monomeric anions.

29. The process according to claim 1, wherein the electrode material of the electrode body is a valve metal or a compound with electrical properties comparable to those of a valve metal.

30. The process according to claim 29, wherein the valve metal or the compound with electrical properties comparable to those of a valve metal is tantalum, niobium, aluminium, titanium, zirconium, hafnium, vanadium, an alloy or compound of at least one of these metals with other elements, NbO or an alloy or compound of NbO with other elements.

31. The process according to claim 1, wherein the dielectric is an oxide of the valve metal or an oxide of the compound with electrical properties comparable to those of a valve metal.

32. The process according to claim 1, wherein after application of the dispersion a) and formation of the electrically conductive polymeric outer layer, the capacitor is optionally provided with further electrically conductive external contacts and is optionally contacted and encapsulated.

33. An electrolytic capacitor produced by the process according to claim 1.

34. The electrolytic capacitor according to claim 33, characterised in that in that the average thickness of the polymeric outer layer is 1 to 100 μm.

35. The electrolytic capacitor according to claim 33, wherein the electrolytic capacitor has a charge-mass ratio greater than 10000 μC/g, based on the weight of the electrode body coated with a dielectric.

36. An electronic circuit which comprises the electrolytic capacitor according to claim 33.

* * * * *